J. McINNES.
BEER MEASURE.
No. 190,607.                                         Patented May 8, 1877.
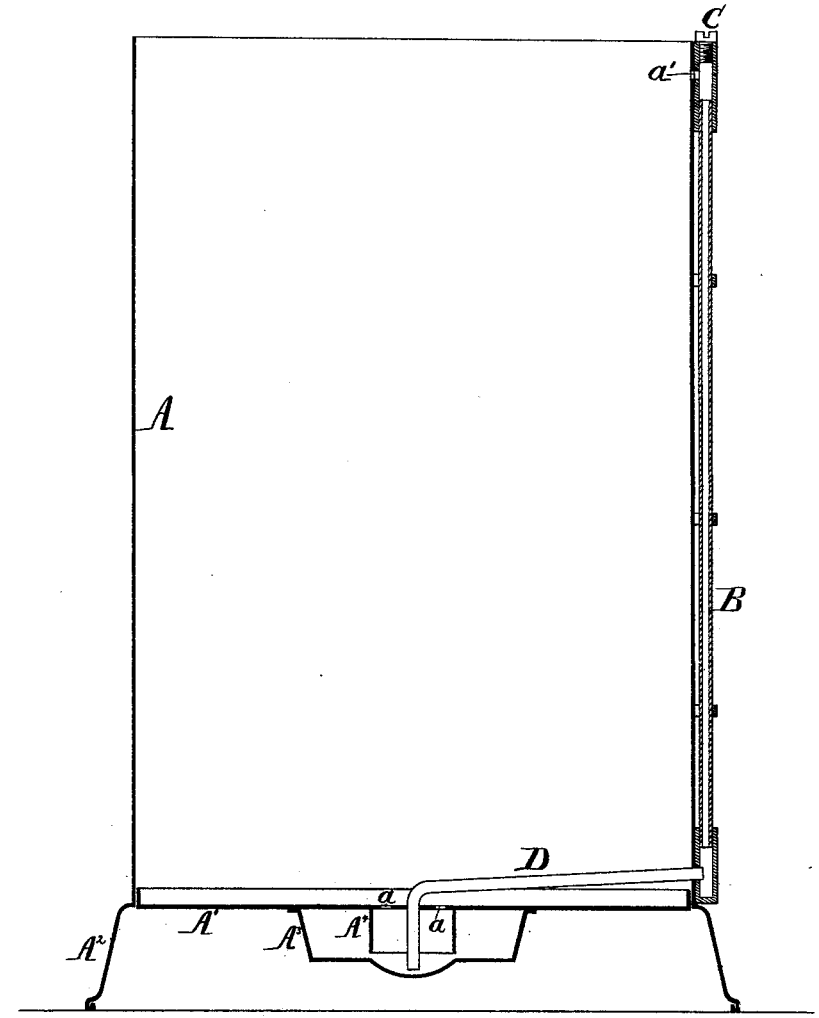

UNITED STATES PATENT OFFICE.

JOHN McINNES, OF JERSEY CITY, NEW JERSEY.

IMPROVEMENT IN BEER-MEASURES.

Specification forming part of Letters Patent No. 190,607, dated May 8, 1877; application filed December 30, 1876.

*To all whom it may concern:*

Be it known that I, JOHN MCINNES, of Jersey City, Hudson county, in the State of New Jersey, have invented certain new and useful Improvements relating to Beer-Measures, of which the following is a specification:

I have in a previous patent, dated April 6, 1875, No. 161,625, set forth means for distinctly indicating the amount of liquid in a given quantity of foam. The weight of the foam pressing upon the flexible diaphragm at the bottom of the measure forced up a liquid of about equal specific gravity to dense beer, and the height to which it was forced was made visible through glass. The present invention avoids the difficulties, among which are the cost and the liability to derangement due to the flexible diaphragm.

I provide a sub-case in the space under the bottom proper of the measure, and allow a communication between the measure and this sub-case through one or more openings of very limited area. This sub-case communicates directly with a side pipe of glass. Before commencing to use the measure I fill the sub-case with water.

As beer is received in the measure a very small quantity sinks through the one or more small openings, and, pressing on the water below, forces it up in the pipe at the side. After the beer is emptied out, the liquid sinks in the side pipe, forcing its way back through the small openings into the body of the measure.

The beer mingles a little with the water at each operation, and the retained liquid soon becomes stale beer; but the mingling is too small to be of any appreciable effect. During the very brief period which the measure is inverted to pour out its contents proper, the escape of the retained fluid through the limited apertures is trifling. Enough would probably remain after any but an unusually-prolonged inversion.

But I increase the perfection of the apparatus by forming a trap within the sub-case, which insures the retention of a liberal quantity for any period. I provide for clearing out the upright glass tube through a removable screw-plug at the top.

The following is a description of what I consider the best means of carrying out the invention.

The accompanying drawing forms a part of this specification, and represents a central vertical section through my improved measure.

Similar letters of reference indicate like parts in all the figures.

A is the main body of the measure, and $A^2$ the rim extending down around the lower edge, and providing, as usual, a space below the bottom $A^1$. $A^3$ is a sub-case soldered to the bottom $A^1$, and capable of containing a few spoonfuls of liquid. $A^4$ is a hanging lip soldered to the bottom $A^1$, and extending down nearly but not quite to the bottom of the sub-case $A^3$. Small holes $a$ communicate between the interior of the measure and the interior of the sub-case $A^3$ within the hanging lip $A^4$. The peripheral chamber in the sub-casing $A^3$, exterior to the lip $A^4$, has no inlet or outlet except through a contracted space under the lip $A^4$.

B is a gage-tube of glass, extending up and down on the exterior of the measure, and secured to the measure at as many points of its length as may be desired. Instead of being all of glass, the outside only of this tube may be of glass, if preferred. A tube, D, which may be of metal, leads from a depression in the center of the bottom of the sub-case $A^3$ to the bottom of the upright tube B. The tube D is open at both ends. The upper end of the tube B is closed by a screw-plug, C. A small opening, $a'$, leads from the upper end of the tube B into the interior of the measure.

The measure may be provided with other attachments—as an ordinary or suitable handle, a flaring-rim at the top, a hinged cover, or the like.

In the use of my measure, water or beer is first put in the measure and allowed considerable time to flow through the one or more small apertures $a$, and partially fill the sub-case $A^3$. The measure being variously inclined and reversed by emptying and filling a few times, the air is largely worked out of the sub-case, and its place occupied with the denser fluid. Thus conditioned, the measure is ready for use.

When beer is drawn into the body of the measure, if it is dense beer, it acts according to the ordinary hydrostatic law, forcing its way down through the apertures $a$, and causing a corresponding rise of itself, or of the other liquid which fills the sub-case, and it is almost instantly forced up in the side tube B until it stands at the same level as the beer in the body of the measure. When foam constitutes a part or the whole of the contents drawn in the body of the measure, its lesser specific gravity is compensated for by the increased volume, and the pressure downward through the small apertures $a$ induces a flow of the dense fluid up in the side tube B, the same being supplied from the quantity retained in the sub-case $A^3$.

On inverting the measure to pour out its contents, a large proportion of the stale beer is retained in the peripheral chamber exterior to the lip $A^4$ in the sub-case $A^3$; and only a small quantity of the liquid in the center of the sub-case will escape through the apertures $a$ during the ordinary brief period of inversion, because of the smallness of the apertures.

A small depression is made in the center of the bottom of the sub-case, as indicated. The pipe D should terminate close to the bottom of that depression.

In ordinary practice the space exterior to the lip $A^4$ in the periphery of the sub-case $A^3$ will be filled partly with stale beer and partly with air. As the measure is inverted and variously inclined the level of the denser fluid will assume various positions in the sub-case, but never such as will empty the sub-case or appreciably affect the truthfulness of the indications. On righting the vessel the dense fluid becomes subject to the pressure of the beer in the measure, and rapidly assumes the proper level in the side tube B, so as to correctly indicate either the actual level of dense beer in the interior, or a level which corresponds to the weight of beer there, whether it be in the form of dense beer or in the lighter foam, or whether it be in any of the intermediate conditions maintained for a little time by most or all newly-drawn beers, ales, and porters of lively quality.

I believe that my invention may be worked with some success without the hanging lip $A^4$, and without the central depression in the base of the sub-case.

Various modifications may be made—as, for example, the tube D may extend along below instead of above the bottom $A^1$ of the measure.

Beer is liable to leave a deposit on the interior of the glass tube B, which impairs its clearness. The removal of my screw-plug C allows the insertion of a wire with a small sponge to clean it. Screwing down tightly the screw-plug secures the upper end again as reliably as ever.

I claim as my invention—

1. The sub-case $A^3$, communicating, through one or more limited apertures, $a$, with the interior of the measure, and put in free communication, by the pipe D, with the gage-tube B, as and for the purposes herein specified.

2. The hanging lip $A^4$, in combination with the sub-chamber $A^3$, measure A, gage-tube B, and connecting-passage D, as herein specified.

3. The screw-plug C, arranged in line with the gage-tube B, and adapted to serve therewith, as herein specified.

In testimony whereof I have hereunto set my hand this 28th day of December, 1876, in the presence of two subscribing witnesses.

JOHN McINNES.

Witnesses:
A. HENRY GENTNER,
CHAS. C. STETSON.